US010986101B2

(12) United States Patent
Lu (10) Patent No.: US 10,986,101 B2
(45) Date of Patent: *Apr. 20, 2021

(54) METHOD AND DEVICE FOR PREVENTING SERVER FROM BEING ATTACKED

(71) Applicant: Advanced New Technologies Co., Ltd., George Town (KY)

(72) Inventor: Yaran Lu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,326

(22) Filed: Dec. 20, 2019

(65) Prior Publication Data

US 2020/0137075 A1 Apr. 30, 2020

Related U.S. Application Data

(63) Continuation of application No. 16/202,809, filed on Nov. 28, 2018, which is a continuation of application No. PCT/CN2017/080862, filed on Apr. 18, 2017.

(30) Foreign Application Priority Data

May 31, 2016 (CN) .......................... 201610377847.0

(51) Int. Cl.
*H04L 29/06* (2006.01)
*H04L 29/02* (2006.01)
(Continued)

(52) U.S. Cl.
CPC .......... *H04L 63/123* (2013.01); *G06F 16/838* (2019.01); *G06F 16/8373* (2019.01);
(Continued)

(58) Field of Classification Search
CPC .............................. H04L 63/123; H04L 63/12
See application file for complete search history.

(56) References Cited

U.S. PATENT DOCUMENTS 5,541,996 A * 7/1996 Ridenour .............. H04L 9/0662
331/78
6,941,512 B2 9/2005 Cheng
(Continued)

FOREIGN PATENT DOCUMENTS

CN 101030860 9/2007
CN 101437030 5/2009
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Ponnoreay Pich
(74) *Attorney, Agent, or Firm* — Fish & Richardson P.C.

(57) ABSTRACT

A page request is received from a browser. A page script corresponding to the page request is allocated from a plurality of page scripts corresponding to the page request. The page script is transmitted to the browser for generation of a script execution parameter by execution of the page script by the browser. A page verification request is received from the browser, where the page verification request includes the script execution parameter. Whether a page verification request is expired is determined, where if the page verification request is expired, generating error prompt information indicating a page expiration. If the page verification request is not expired, whether the script execution param-
(Continued)

eter is valid, is determined. If the script execution parameter is valid, the validity is indicated, otherwise the page request is rejected.

20 Claims, 6 Drawing Sheets (51) Int. Cl.
    *G06F 16/838*     (2019.01)
    *G06F 16/955*     (2019.01)
    *G06F 16/958*     (2019.01)
    *G06F 16/835*     (2019.01)
    *H04L 9/32*     (2006.01)
    *H04L 29/08*     (2006.01)

(52) U.S. Cl.
    CPC .......... *G06F 16/955* (2019.01); *G06F 16/958* (2019.01); *H04L 9/3239* (2013.01); *H04L 29/02* (2013.01); *H04L 63/1458* (2013.01); *H04L 67/02* (2013.01)

(56) References Cited

U.S. PATENT DOCUMENTS

| | | | |
|---|---|---|---|
| 7,516,153 B2 * | 4/2009 | Hackworth | G06F 8/35 |
| 9,148,427 B2 * | 9/2015 | Lamberton | H04L 63/10 |
| 9,912,718 B1 * | 3/2018 | Lepeska | H04L 67/2842 |
| 2002/0184507 A1 * | 12/2002 | Makower | H04L 63/0428 713/182 |
| 2007/0192739 A1 | 8/2007 | Hunleth et al. | |
| 2007/0282874 A1 * | 12/2007 | Metcalfe | G06F 16/958 |
| 2008/0177859 A1 * | 7/2008 | Nickerson | H04L 67/02 709/217 |
| 2010/0180082 A1 * | 7/2010 | Sebastian | H04L 67/02 711/126 |
| 2013/0318056 A1 | 11/2013 | Lekies et al. | |
| 2014/0053059 A1 | 2/2014 | Weber et al. | |
| 2014/0259145 A1 * | 9/2014 | Khandelwal | H04L 63/1458 726/13 |
| 2015/0365397 A1 | 12/2015 | Chang | |
| 2016/0119304 A1 | 4/2016 | Lelcuk et al. | |
| 2019/0109861 A1 | 4/2019 | Lu | |
| 2020/0137075 A1 | 4/2020 | Lu | |

FOREIGN PATENT DOCUMENTS

| | | |
|---|---|---|
| CN | 101594343 | 12/2009 |
| CN | 101834866 | 9/2010 |
| CN | 102981812 | 3/2013 |
| CN | 103139138 | 6/2013 |
| CN | 103209158 | 7/2013 |
| CN | 103795786 | 5/2014 |
| CN | 104636664 | 5/2015 |
| JP | 2010250791 | 11/2010 |
| JP | 2013125497 | 6/2013 |
| RU | 2327214 | 6/2008 |
| RU | 2477929 | 3/2013 |
| TW | 201327250 | 7/2013 |

OTHER PUBLICATIONS

Extended European Search Report in European Application No. 17805550.5, dated Mar. 21, 2019, 9 pages.
International Search Report by the International Searching Authority issued in International Application No. PCT/CN2017/080862 dated Jul. 12, 2017; 8 pages.
Nakamoto, "Bitcoin: A Peer-to-Peer Electronic Cash System," www.bitcoin.org, 2005, 9 pages.
PCT International Preliminary Report on Patentability in International Application No. PCT/CN2017/080862, dated Dec. 4, 2018, 9 pages (with English translation).
Stackoverflow.com [online], "Script to load random page on page load/refresh?," Aug. 10, 2014, via Internet Archive: Wayback Machine URL <https ://web.archive.org/web/20140810205841/https:// stackoverflow.com/questions/24881707/script-to-load-random-page-on-page-load-refresh>, [retrieved on Mar. 12, 2019], retrieved from: URL<https://stackoverflow.com/questions/24881707/script-to-load-random-page-on-page-load-refresh>, 3 pages.

* cited by examiner

METHOD AND DEVICE FOR PREVENTING SERVER FROM BEING ATTACKED

CROSS-REFERENCE TO RELATED APPLICATIONS

This application is a continuation of U.S. patent application Ser. No. 16/202,809, filed on Nov. 28, 2018, which is a continuation of PCT Application No. PCT/CN2017/080862, filed on Apr. 18, 2017, which claims priority to Chinese Patent Application No. 201610377847.0, filed on May 31, 2016, and each application is hereby incorporated by reference in its entirety.

TECHNICAL FIELD

The present disclosure relates to the field of network security technologies, and in particular, to a method and device for preventing a server from being attacked.

BACKGROUND

As Internet technologies rapidly develop, network security assurance attracts more attention. Generally, network security relates to how to prevent a server in the network from being attacked. To attack a server, an attacker uses a service request to occupy excessive service resources of the server, which leads to overload of the server. Moreover, the server cannot respond to other requests, and consequently the resources of the server can run out. As such, the attacker makes the server to refuse to provide services.

Currently, a browser first sends a service request to the server. The service request includes a token value in the cookie (data stored by the server on a local terminal device of a user) encrypted by using the message digest algorithm 5 (MD5). After receiving the service request, the server verifies the encrypted token value to determine whether the service request sent by the browser is valid to prevent the server from being attacked. However, the encrypted token value is obtained by executing static script code, and the static script code is exposed in a plaintext. Therefore, the attacker can directly obtain logic in the static script code and parse out the encryption method of the token value. As such, the attacker can skip a detection mechanism of the server by simulating the service request of the regular user and then attack the server. Therefore, security protection for the existing server is low.

SUMMARY

In view of the previous problem, the present disclosure is proposed to provide a method and device for preventing a server from being attacked, to overcome the previous problem or at least partially resolve the previous problem.

To achieve the previous objective, the present disclosure mainly provides the technical solutions below.

According to one aspect, an implementation of the present disclosure provides a method for preventing a server from being attacked, and the method includes the following: dynamically and randomly allocating a page script corresponding to a page request from a plurality of page scripts corresponding to the page request, when receiving the page request sent by a browser; sending the dynamically and randomly allocated page script to the browser, so that the browser executes the page script to obtain a script execution parameter; determining whether the page verification request is expired, when receiving a page verification

2 request sent by the browser; and if expired, outputting error prompt information indicating page expiration; or if unexpired, verifying whether the script execution parameter included in the page verification request is valid; and if invalid, rejecting the page request.

According to another aspect, an implementation of the present disclosure further provides a device for preventing a server from being attacked, and the device includes an allocation unit, configured to dynamically and randomly allocate a page script corresponding to a page request from a plurality of page scripts corresponding to the page request, when the page request sent by a browser is received; a sending unit, configured to send the dynamically and randomly allocated page script to the browser, so that the browser executes the page script to obtain a script execution parameter; a determining unit, configured to determine whether a page verification request is expired, when the page verification request sent by the browser is received; an output unit, configured to output error prompt information indicating page expiration, if the page verification request is expired; a verification unit, configured to verify whether the script execution parameter included in the page verification request is valid, if the page verification request is not expired; and a rejection unit, configured to reject the page request if the script execution parameter included in the page verification request is invalid.

Based on the above, the technical solutions provided in the implementations of the present disclosure have at least the advantages below.

According to the method and device for preventing a server from being attacked provided in the implementations of the present disclosure, when receiving the page verification request sent by the browser, the server first determines whether the page verification request is expired. If the page verification request is unexpired, the server verifies whether the script execution parameter included in the page verification request is valid. If the script execution parameter is invalid, the server rejects the page request to prevent the server from being attacked. Currently, the server verifies an encrypted token value to determine whether a service request sent by the browser is valid to prevent the server from being attacked. Compared with this, in the present disclosure, the server verifies the script execution parameter to prevent the server from being attacked. The script execution parameter is obtained based on the page script dynamically and randomly allocated from the plurality of page scripts corresponding to the page request, and different script execution parameter acquisition logic is used in the page scripts. Therefore, even if an attacker obtains script logic in dynamic code, the attacker cannot parse out the encryption method of the script execution parameter within a predetermined time period. In addition, when the request time of the page verification request exceeds the predetermined time period, the server rejects the page request. The browser needs to reload a page verification request to send the page verification request again, and a script execution parameter in the reloaded page verification request is obtained by executing a re-extracted page script. Therefore, the attacker cannot attack the server in the implementations of the present disclosure. As such, security of the server is improved in the implementations of the present disclosure.

BRIEF DESCRIPTION OF DRAWINGS

By reading the detailed descriptions of the following preferred implementations, various other advantages and benefits can be understood by a person of ordinary skill in the art. The accompanying drawings are only used for the purpose of illustrating the preferred implementations, and are not considered as a limitation on the present disclosure. In addition, the same reference symbols are used to represent the same components throughout the accompanying drawings. In the accompanying drawings.

DESCRIPTION OF IMPLEMENTATIONS

The following describes the example implementations of the present disclosure in more detail with reference to the accompanying drawings. Although the accompanying drawings show the example implementations of the present disclosure, it should be understood that the present disclosure can be implemented in various forms, and shall not be limited by the implementations described here. Instead, these implementations are provided to provide a more thorough understanding of the present disclosure and to completely convey the scope of the present disclosure to a person of ordinary skill in the art.

To make the advantages of the technical solutions in the present disclosure clearer, the following describes the present disclosure in detail with reference to the accompanying drawings and the implementations.

Figure 1:
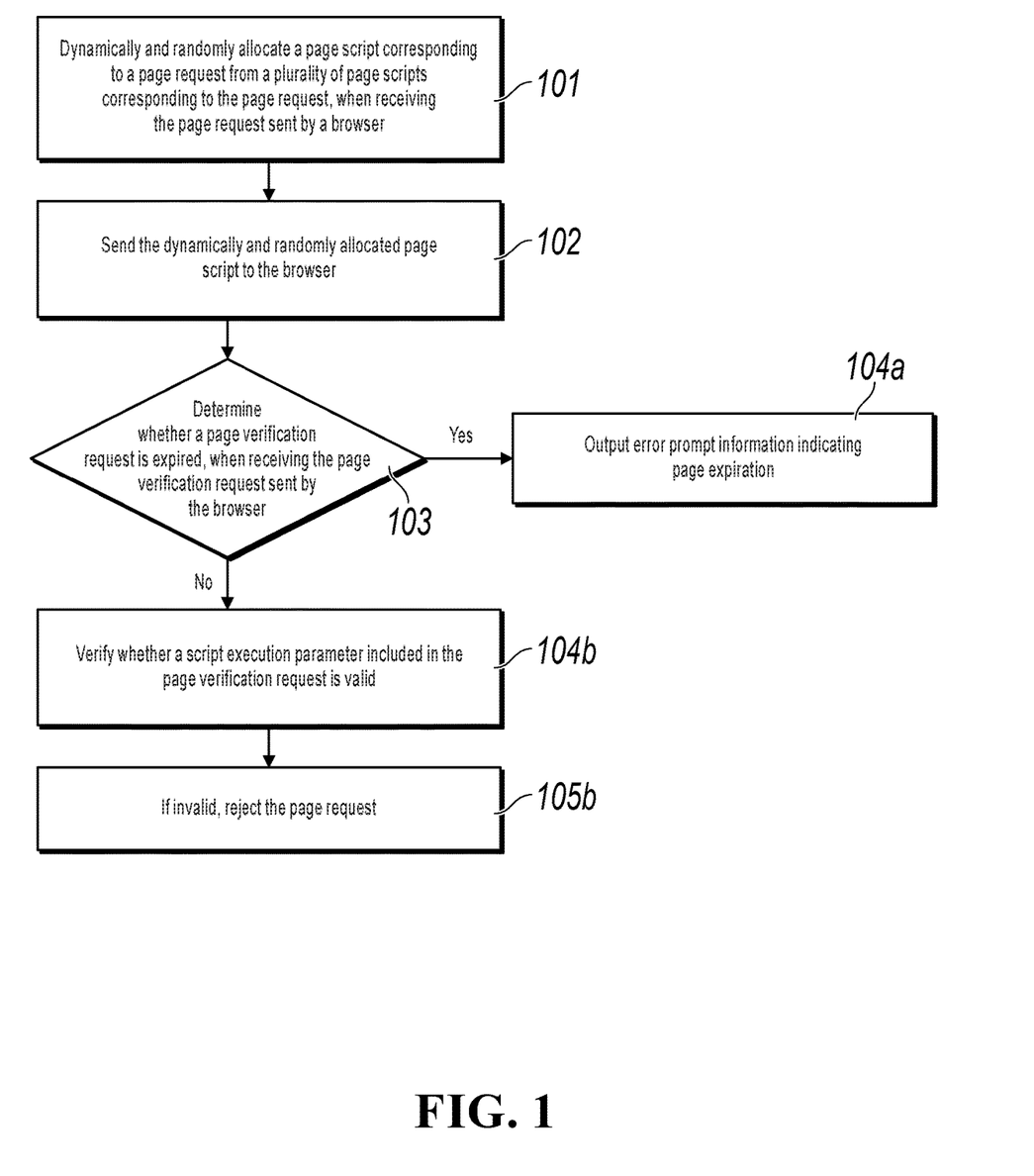
FIG. 1 is a flowchart illustrating a method for preventing a server from being attacked, according to an implementation of the present disclosure.

An implementation of the present disclosure provides a method for preventing a server from being attacked. As shown in FIG. 1, the method includes the steps below.

101. Dynamically and randomly allocate a page script corresponding to the page request from a plurality of page scripts corresponding to the page request, when receiving a page request sent by a browser.

The page request includes a page URL, and the page URL is a page that is corresponding to the page script requested by the browser. In this implementation of the present disclosure, one page URL is corresponding to a plurality of page scripts. Different script execution parameter acquisition logic is used in page scripts corresponding to the same page URL. A plurality of different script execution parameters are obtained when a plurality of page scripts corresponding to the same page URL are executed. Page execution results of the plurality of page scripts corresponding to the same page URL are the same, that is, pages generated after the browser loads and executes the page scripts are the same. It is worthwhile to note that in this implementation of the present disclosure, the page script corresponding to the page request can be dynamically and randomly allocated from the plurality of page scripts corresponding to the page request by using a random number generated based on a current time or a random number generated based on a time for sending the page request. No specific limitation is imposed in this implementation of the present disclosure.

For example, if a user enters a URL of AMAZON in an address bar of the browser and presses an enter key, the server receives a page request sent by the browser. A page URL in the page request is AMAZON. Then, the server dynamically and randomly allocates a page script corresponding to the page request from a plurality of page scripts corresponding to the page request. That is, the server dynamically and randomly allocates a page script corresponding to the page request from a plurality of page scripts corresponding to AMAZON.

102. Send the dynamically and randomly allocated page script to the browser.

Further, the browser loads and executes the page script to obtain a script execution parameter. After loading and executing the page script, the browser displays a corresponding page and obtains the script execution parameter. Script execution parameters are some additional parameters on the page and do not affect the displayed page. In this implementation of the present disclosure, when page scripts corresponding to the same page URL are executed, different script execution parameters are generated in different page script execution results.

For example, a certain page URL is corresponding to three page scripts. Script execution parameter acquisition logic in a page script is to obtain an encrypted token value in cookie information. Script execution parameter acquisition logic in another page script is to obtain encrypted values of current mouse coordinates of the user. Script execution parameter acquisition logic in the remaining page script is to obtain an encrypted value of a current time. It is worthwhile to note that in this implementation of the present disclosure, logic for executing the page script and the encryption method of the script execution parameter are not limited, provided that different script execution parameter acquisition logic is used in the page scripts in the present disclosure to distinguish between different page scripts.

103. Determine whether a page verification request is expired, when receiving the page verification request sent by the browser.

The page verification request can be sent by using the page obtained based by loading and executing in step 102. Specifically, the request can be sent by clicking a certain link on the page, selecting a certain command button, entering some keywords, etc. No specific limitation is imposed in this implementation of the present disclosure. The page verification request includes the script execution parameter, and the script execution parameter is an encrypted parameter.

In this implementation of the present disclosure, a specific process of determining whether the page verification request is expired can be as follows: First, the server obtains a request time of the page verification request and a time for the browser to execute the page script from the page verification request. Then, the server determines whether the request time of the page verification request is later than the sum of a predetermined time period and the time for the browser to execute the page script. The server determines that the page verification request is expired, if the request time of the page verification request is later than the sum of the predetermined time period and the time for the browser to execute the page script. The server determines that the page verification request is not expired, if the request time of the page verification request is not later than the sum of the predetermined time period and the time for the browser to execute the page script.

The predetermined time period can be set based on actual requirements, for example, 10 minutes, 20 minutes, or 40 minutes. No limitation is imposed in this implementation of the present disclosure. It is worthwhile to note that an attacker can attack the server by simulating behavior of the regular user, and it takes time for the attacker to simulate the behavior of the regular user. Therefore, in this implementation of the present disclosure, under the condition that the user can send a request to the server normally, the shorter the predetermined time period, the less likely the attacker is to attack the server.

For example, if the request time of the page verification request obtained from the page verification request is 13:15, the time for the browser to execute the page script is 12:34, and the predetermined time period is one hour, the server determines that the request time of the page verification request is earlier than the sum of the predetermined time period and the time for the browser to execute the page script, that is, 13:15 is earlier than 13:34. Hence the page verification request is not expired. If the request time of the page verification request is 14:12, the server can use the previous determining method to conclude that the page verification request has expired.

104a. If expired, output error prompt information indicating page expiration.

In this implementation of the present disclosure, the error prompt information indicating page expiration is output if the page verification request has expired, to prompt the user with a fact that the current page has expired. If the user still wants to perform an operation on the page, the user needs to refresh the page. Refreshing the page is equivalent to sending a page request to the server. After receiving the request, the server dynamically and randomly allocates a page script corresponding to the page request from a plurality of page scripts corresponding to the page request. That is, after step 104a, if receiving a refresh instruction from the user, the server jumps to step 101 to perform step 101 again.

104b. If not expired, verify whether a script execution parameter included in the page verification request is valid.

Step 104b is parallel to step 104a. The server verifies whether the script execution parameter included in the page verification request is valid, if the page verification request is not expired. In this implementation of the present disclosure, the server can verify, based on the page script executed to obtain the script execution parameter, whether the script execution parameter is valid. A specific process of step 104b can be as follows: First, the server obtains a local script parameter based on the page script, and then determines whether the local script parameter is the same as the script execution parameter included in the page verification request; if yes, it indicates that the script execution parameter is valid; if no, it indicates that the script execution parameter is invalid.

For example, after the page verification request sent by the browser is received, if script execution parameter acquisition logic in the page script dynamically and randomly extracted from the plurality of page scripts corresponding to the page request is to obtain a token value in cookie information that is encrypted by using a message digest algorithm 5 (MD5), and the page verification request is in a validity period, the server determines, based on the script execution parameter acquisition logic in the page script, whether verification on the script parameter can succeed. That is, the server determines, based on the MD5 encrypted value of the token in the corresponding cookie information stored in the server, whether verification on the script parameter sent by the browser can succeed.

105b. If invalid, reject the page request.

In this implementation of the present disclosure, the page request is rejected if the script execution parameter is invalid after verification. Afterwards, if the user still wants to perform an operation on the page, the user needs to refresh the page. Refreshing the page is equivalent to sending a page request to the server. After receiving the request, the server dynamically and randomly allocates a page script corresponding to the page request from a plurality of page scripts corresponding to the page request. That is, after step 105b, if receiving a refresh instruction from the user, the server jumps to step 101 to perform step 101 again.

It is worthwhile to note that in the present disclosure, the page request can be rejected by using user identity information in the page verification request, and the user identity information is cookie information generated by the server. After receiving the cookie information sent by the server, the browser stores a key/value in the cookie information into a text file in a certain directory. The browser sends the cookie information to the server when requesting a webpage next time. If the page verification request sent by the browser has expired, or the script execution parameter is invalid after verification, the server can set a service corresponding to the cookie information in the page verification request to "reject" so as to reject the page request.

In the method for preventing a server from being attacked provided in this implementation of the present disclosure, when receiving the page verification request sent by the browser, the server first determines whether the page verification request is expired. If the page verification request is not expired, the server verifies whether the script execution parameter included in the page verification request is valid. If the script execution parameter is invalid, the server rejects the page request to prevent the server from being attacked. Currently, the server verifies an encrypted token value to determine whether a service request sent by the browser is valid to prevent the server from being attacked. Compared with this, in the present disclosure, the server verifies the script execution parameter to prevent the server from being attacked. The script execution parameter is obtained based on the page script dynamically and randomly allocated from the plurality of page scripts corresponding to the page request, and different script execution parameter acquisition logic is used in the page scripts. Therefore, even if an attacker obtains script logic in dynamic code, the attacker cannot parse out the encryption method of the script execution parameter within the predetermined time period. In addition, when the request time of the page verification request exceeds the predetermined time period, the server rejects the page request. The browser needs to reload a page verification request to send the page verification request again, and a script execution parameter in the reloaded page verification request is obtained by executing a re-extracted page script. Therefore, the attacker cannot attack the server in this implementation of the present disclosure. As such, security of the server is improved in this implementation of the present disclosure.

Figure 2:
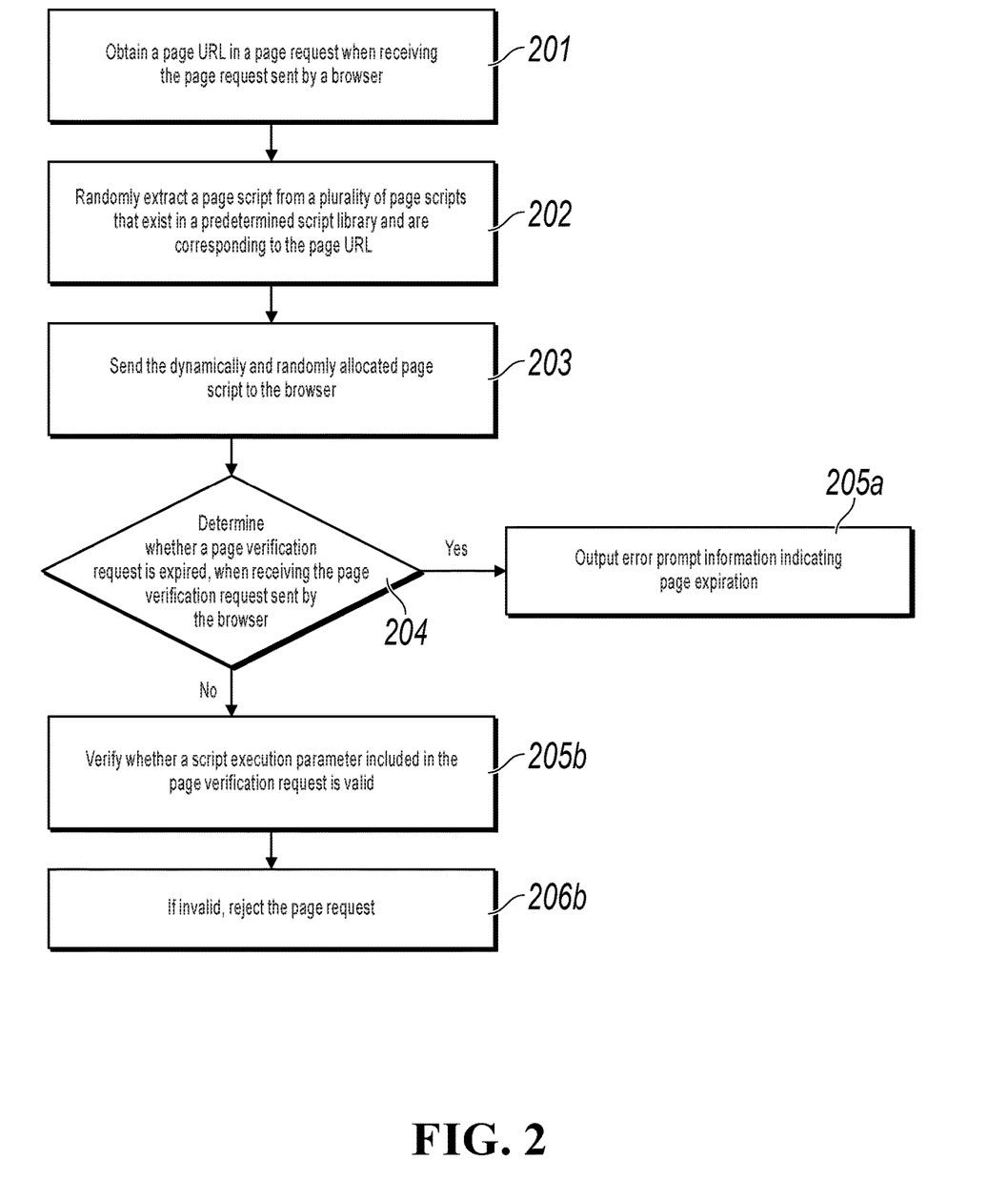
FIG. 2 is a flowchart illustrating another method for preventing a server from being attacked, according to an implementation of the present disclosure.

An implementation of the present disclosure provides another method for preventing a server from being attacked. As shown in FIG. 2, the method includes the steps below.

201. Obtain a page URL in a page request when receiving the page request sent by a browser.

202. Randomly extract a page script from a plurality of page scripts that exist in a predetermined script library and are corresponding to the page URL.

Different script execution parameter acquisition logic is used in the plurality of page scripts. In this implementation of the present disclosure, before step 202, the method further includes configuring page scripts corresponding to each page URL in the predetermined script library. The predetermined script library stores a plurality of page scripts respectively corresponding to different page URLs. Different script parameter acquisition logic is used in page scripts corresponding to each page URL. In this implementation of the present disclosure, the page script is used to execute and load a page that the browser requests, and obtain a script execution parameter from an execution result. When page scripts corresponding to the same page URL are executed, different script execution parameters are generated from executing different page scripts.

It is worthwhile to note that, because the only difference between the page scripts is that different script execution parameter acquisition logic is used, pages generated by loading and executing the page scripts are the same. The only difference from execution of the page scripts is that the script execution parameters generated are different.

203. Send the dynamically and randomly allocated page script to the browser.

Further, the browser executes the page script to obtain a script execution parameter. After loading and executing the page script, the browser displays a corresponding page and obtains the script execution parameter. Script execution parameters are some additional parameters on the page and do not affect the displayed page.

204. Determine whether a page verification request is expired, when receiving the page verification request sent by the browser.

In this implementation of the present disclosure, step 204 includes determining whether a request time of the page verification request is later than the sum of a predetermined time period and a time for the browser to execute the page script; and if yes, determining that the page verification request is expired; or if no, determining that the page verification request is not expired. The predetermined time period is used to limit a time when the browser can send the page request to the server, and the predetermined time period can be set based on actual requirements.

It is worthwhile to note that an attacker can attack the server by simulating behavior of the regular user, and it takes time for the attacker to simulate the behavior of the regular user. Therefore, in this implementation of the present disclosure, under the condition that the user can send a request to the server normally, the shorter the predetermined time period, the less likely the attacker is to attack the server.

205a. If expired, output error prompt information indicating page expiration.

205b. If not expired, verify whether a script execution parameter included in the page verification request is valid.

Step 205b is parallel to step 205a. If the page verification request is not expired, the server verifies whether the script execution parameter included in the page verification request is valid. In this implementation of the present disclosure, the page request further includes identifier information of the page script executed by the browser. Step 205b includes the following: searching the predetermined script library for a page script corresponding to the identifier information, where the predetermined script library further stores identifier information corresponding to each page script; and verifying, based on the page script corresponding to the identifier information, whether the script execution parameter included in the page verification request is valid. The page script executed by the browser is the page script sent by the server to the browser in step 203. When sending the page script to the browser, the server also sends the identifier information corresponding to the page script to the browser. When sending the page verification request to the server, the browser also sends the identifier information of the page script to the server. Then, the server obtains a corresponding page script from the predetermined script library based on the identifier information of the page script, and verifies, based on the obtained page script, whether the script execution parameter is correct.

In this implementation of the present disclosure, the verifying, based on the page script corresponding to the identifier information, whether the script execution parameter included in the page verification request is valid includes obtaining a local script parameter based on the page script corresponding to the identifier information; determining whether the local script parameter is the same as the script execution parameter included in the page verification request; and if yes, determining that the script execution parameter is valid; or if no, determining that the script execution parameter is invalid.

206b. If invalid, reject the page request.

In this implementation of the present disclosure, if the script execution parameter is invalid after verification, the page request is rejected. Afterwards, if the user still wants to perform an operation on the page, the user needs to refresh the page. Refreshing the page is equivalent to sending a page request to the server. After receiving the request, the server dynamically and randomly allocates a page script corresponding to the page request from a plurality of page scripts corresponding to the page request. That is, after rejecting the page request, if receiving a refresh instruction from the user, the server jumps to step 201 to perform step 201 again, and randomly re-extracts a page script after performing step 201 again. Therefore, the attacker cannot attack the server in this implementation of the present disclosure. As such, security of the server is improved in this implementation of the present disclosure.

Figure 5:
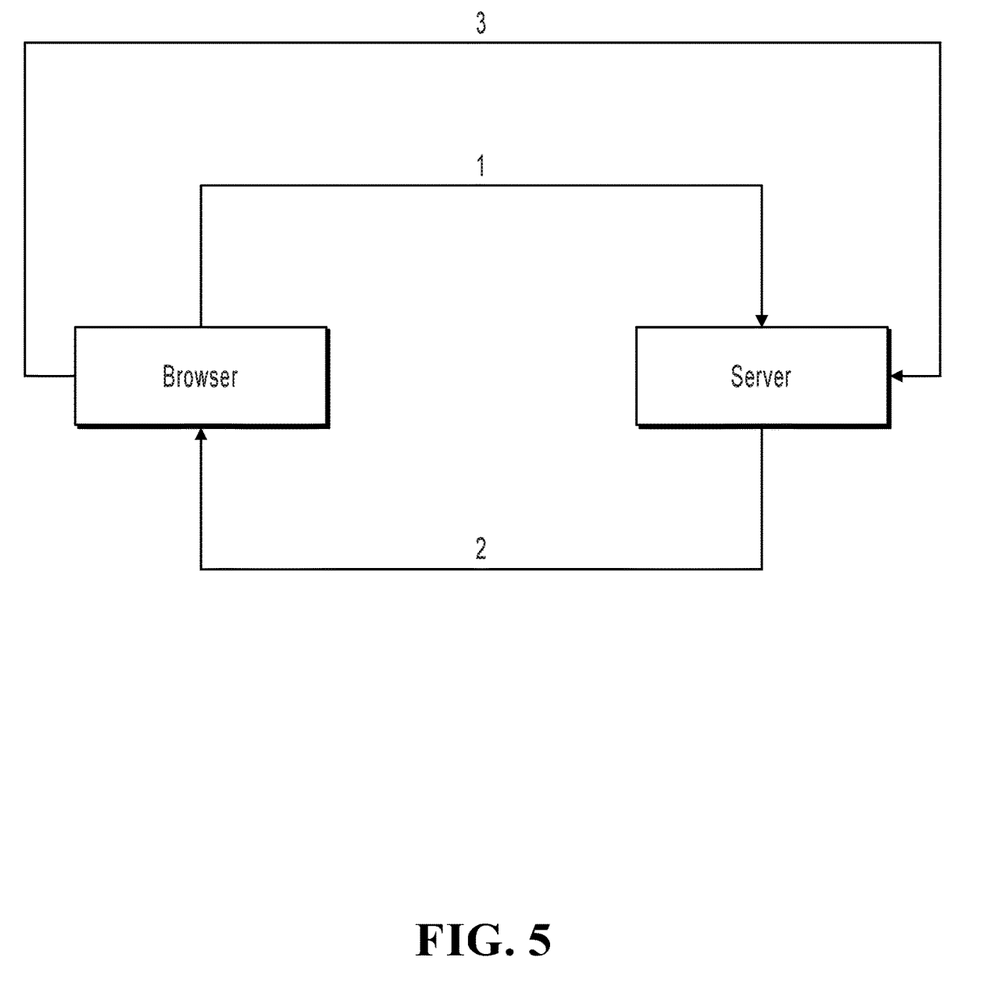
FIG. 5 is a block diagram illustrating a system for preventing a server from being attacked, according to an implementation of the present disclosure.

In this implementation of the present disclosure, a scenario shown in FIG. 5 can be applied, but is not limited to this. The scenario includes the following: In step 1 in FIG. 5, the browser first sends the page request to the server. The page request includes the page URL. After receiving the page request, the server randomly extracts the page script corresponding to the page URL from the predetermined script library, and then sends the page script to the browser. That is, the server sends the randomly extracted page script to the browser by using step 2 in FIG. 5. After receiving the page script sent by the server, the browser executes the page script and obtains the script execution parameter obtained by executing the page script. Then, the browser sends the page verification request to the server. The page verification request includes the script execution parameter. That is, the browser sends the page verification request to the server by using step 3 in FIG. 5. After receiving the page verification request, the server first determines whether the time of the page verification request is later than the sum of the predetermined time period and the time for the browser to execute the page script. The server verifies whether the script execution parameter is valid, if the time of the page verification request is earlier than the sum of the predetermined time period and the time for the browser to execute the page script. If invalid, the server rejects the page request. The script execution parameter in the present disclosure is obtained by executing the page script that is corresponding to the page URL and is randomly extracted from the predetermined script library, and different script execution parameter acquisition logic is used in the page scripts. Therefore, even if an attacker obtains script logic in dynamic code, the attacker cannot parse out the encryption method of the script execution parameter within the predetermined time period. In addition, when the page verification request is expired, the browser needs to reload a page verification request, and a script execution parameter in the reloaded page verification request is obtained by executing a re-extracted page script corresponding to the page URL. Therefore, the attacker cannot attack the server in this implementation of the present disclosure. As such, security of the server is improved in this implementation of the present disclosure.

In another method for preventing a server from being attacked provided in this implementation of the present disclosure, when receiving the page verification request sent by the browser, the server first determines whether the page verification request is expired. If the page verification request is not expired, the server verifies whether the script execution parameter included in the page verification request is valid. If the script execution parameter is invalid, the server rejects the page request to prevent the server from being attacked. Currently, the server verifies an encrypted token value to determine whether a service request sent by the browser is valid to prevent the server from being attacked. Compared with this, in the present disclosure, the server verifies the script execution parameter to prevent the server from being attacked. The script execution parameter is obtained based on the page script dynamically and randomly allocated from the plurality of page scripts corresponding to the page request, and different script execution parameter acquisition logic is used in the page scripts. Therefore, even if an attacker obtains script logic in dynamic code, the attacker cannot parse out the encryption method of the script execution parameter within the predetermined time period. In addition, when the request time of the page verification request exceeds the predetermined time period, the server rejects the page request. The browser needs to reload a page verification request to send the page verification request again, and a script execution parameter in the reloaded page verification request is obtained by executing a re-extracted page script. Therefore, the attacker cannot attack the server in this implementation of the present disclosure. As such, security of the server is improved in this implementation of the present disclosure.

Figure 3:
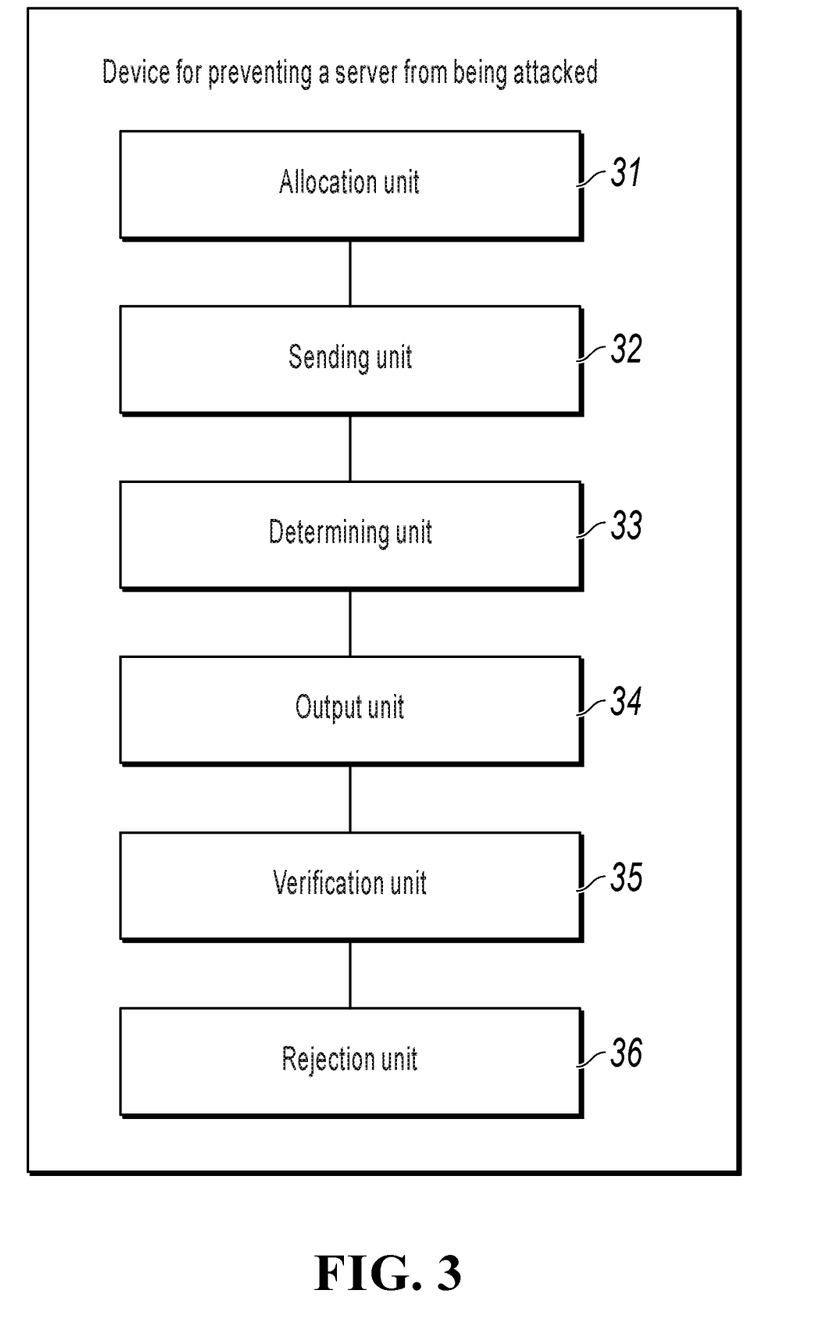
FIG. 3 is a composition block diagram illustrating a device for preventing a server from being attacked, according to an implementation of the present disclosure.

Further, an implementation of the present disclosure provides a device for preventing a server from being attacked. As shown in FIG. 3, the device includes an allocation unit 31, a sending unit 32, a determining unit 33, an output unit 34, a verification unit 35, and a rejection unit 36.

The allocation unit 31 is configured to dynamically and randomly allocate a page script corresponding to a page request from a plurality of page scripts corresponding to the page request, when the page request sent by a browser is received.

The sending unit 32 is configured to send the dynamically and randomly allocated page script to the browser, so that the browser executes the page script to obtain a script execution parameter.

The determining unit 33 is configured to determine whether a page verification request is expired, when the page verification request sent by the browser is received.

The output unit 34 is configured to output error prompt information indicating page expiration if expired.

The verification unit 35 is configured to verify whether the script execution parameter included in the page verification request is valid, if the page verification request is not expired.

The rejection unit 36 is configured to reject the page request if the script execution parameter included in the page verification request is invalid.

It is worthwhile to note that, for other corresponding descriptions of the function units in the device for preventing a server from being attacked in this implementation of the present disclosure, reference can be made to corresponding descriptions of the method shown in FIG. 1. Details are omitted here for simplicity. However, it should be clear that the device in this implementation can correspondingly implement all the content in the method implementation.

According to the method and device for preventing a server from being attacked provided in the implementations of the present disclosure, when receiving the page verification request sent by the browser, the server first determines whether the page verification request is expired. If the page verification request is not expired, the server verifies whether the script execution parameter included in the page verification request is valid. If the script execution parameter is invalid, the server rejects the page request to prevent the server from being attacked. Currently, the server verifies an encrypted token value to determine whether a service request sent by the browser is valid to prevent the server from being attacked. Compared with this, in the present disclosure, the server verifies the script execution parameter to prevent the server from being attacked. The script execution parameter is obtained based on the page script dynamically and randomly allocated from the plurality of page scripts corresponding to the page request, and different script execution parameter acquisition logic is used in the page scripts. Therefore, even if an attacker obtains script logic in dynamic code, the attacker cannot parse out the encryption method of the script execution parameter within a predetermined time period. In addition, when a request time of the page verification request exceeds the predetermined time period, the server rejects the page request. The browser needs to reload a page verification request to send the page verification request again, and a script execution parameter in the reloaded page verification request is obtained by executing a re-extracted page script. Therefore, the attacker cannot attack the server in this implementation of the present disclosure. As such, security of the server is improved in this implementation of the present disclosure.

Figure 4:
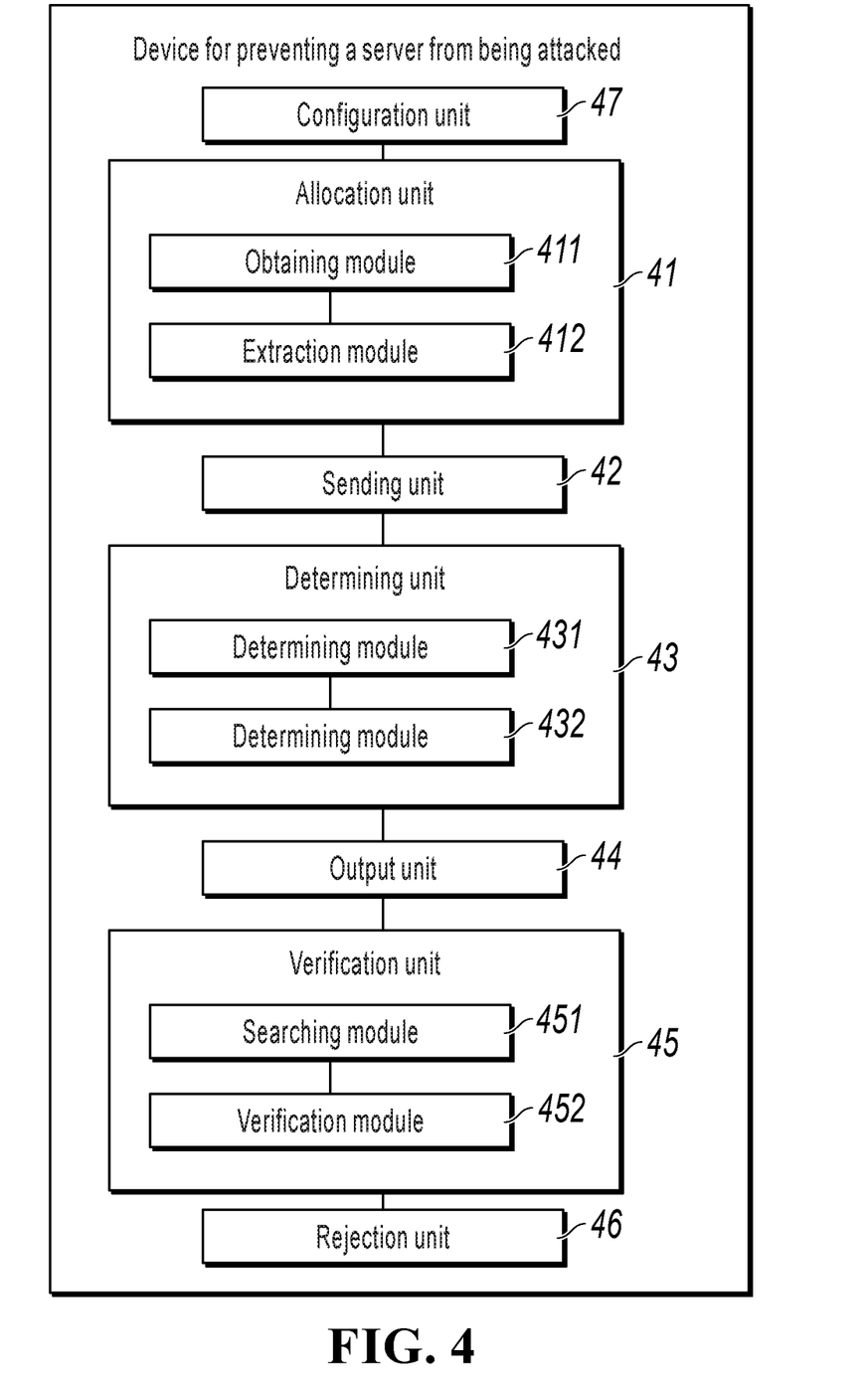
FIG. 4 is a composition block diagram illustrating another device for preventing a server from being attacked, according to an implementation of the present disclosure.

Further, an implementation of the present disclosure provides another device for preventing a server from being attacked. As shown in FIG. 4, the device includes an allocation unit 41, a sending unit 42, a determining unit 43, an output unit 44, a verification unit 45, and a rejection unit 46.

The allocation unit 41 is configured to dynamically and randomly allocate a page script corresponding to a page request from a plurality of page scripts corresponding to the page request, when the page request sent by a browser is received.

The sending unit 42 is configured to send the dynamically and randomly allocated page script to the browser, so that the browser executes the page script to obtain a script execution parameter.

The determining unit 43 is configured to determine whether a page verification request is expired, when the page verification request sent by the browser is received.

The output unit 44 is configured to output error prompt information indicating page expiration, if the page verification request is expired.

The verification unit 45 is configured to verify whether the script execution parameter included in the page verification request is valid, if the page verification request is not expired.

The rejection unit 46 is configured to reject the page request if the script execution parameter included in the page verification request is invalid.

Further, the allocation unit 41 includes an obtaining module 411, configured to obtain a page URL in the page request; and an extraction module 412, configured to randomly extract a page script from a plurality of page scripts that exist in a predetermined script library and are corresponding to the page URL, where different script execution parameter acquisition logic is used in the plurality of page scripts.

Further, the determining unit 43 includes a determining module 431, configured to determine whether a request time of the page verification request is later than the sum of a predetermined time period and a time for the browser to execute the page script; and a determining module 432, configured to determine that the page verification request is expired, if the request time of the page verification request is later than the sum of the predetermined time period and the time for the browser to execute the page script; or a determining module 432, configured to determine that the page verification request is not expired, if the request time of the page verification request is not later than the sum of the predetermined time period and the time for the browser to execute the page script.

In this implementation of the present disclosure, the page request further includes identifier information of the page script executed by the browser, and the verification unit 45 includes a searching module 451, configured to search the predetermined script library for a page script corresponding to the identifier information, where the predetermined script library further stores identifier information corresponding to each page script; and a verification module 452, configured to verify, based on the page script corresponding to the identifier information, whether the script execution parameter included in the page verification request is valid.

In this implementation of the present disclosure, the verification module 452 is configured to obtain a local script parameter based on the page script corresponding to the identifier information.

The verification module 452 is configured to determine whether the local script parameter is the same as the script execution parameter included in the page verification request.

The verification module 452 is configured to determine that the script execution parameter is valid, if the local script parameter is the same as the script execution parameter included in the page verification request.

The verification module 452 is configured to determine that the script execution parameter is invalid, if the local script parameter is different from the script execution parameter included in the page verification request.

The device further includes a configuration unit 47, configured to configure page scripts corresponding to each page URL in the predetermined script library.

It is worthwhile to note that, for other corresponding descriptions of the function units in another device for preventing a server from being attacked in this implementation of the present disclosure, reference can be made to corresponding descriptions of the method shown in FIG. 2. Details are omitted here for simplicity. However, it should be clear that the device in this implementation can correspondingly implement all the content in the method implementation.

According to the method and device for preventing a server from being attacked provided in the implementations of the present disclosure, when receiving the page verification request sent by the browser, the server first determines whether the page verification request is expired. If the page verification request is not expired, the server verifies whether the script execution parameter included in the page verification request is valid. If the script execution parameter is invalid, the server rejects the page request to prevent the server from being attacked. Currently, the server verifies an encrypted token value to determine whether a service request sent by the browser is valid to prevent the server from being attacked. Compared with this, in the present disclosure, the server verifies the script execution parameter to prevent the server from being attacked. The script execution parameter is obtained based on the page script dynamically and randomly allocated from the plurality of page scripts corresponding to the page request, and different script execution parameter acquisition logic is used in the page scripts. Therefore, even if an attacker obtains script logic in dynamic code, the attacker cannot parse out the encryption method of the script execution parameter within the predetermined time period. In addition, when the request time of the page verification request exceeds the predetermined time period, the server rejects the page request. The browser needs to reload a page verification request to send the page verification request again, and a script execution parameter in the reloaded page verification request is obtained by executing a re-extracted page script. Therefore, the attacker cannot attack the server in this implementation of the present disclosure. As such, security of the server is improved in this implementation of the present disclosure.

The device for preventing a server from being attacked includes a processor and a memory. The allocation unit, the sending unit, the determining unit, the output unit, the verification unit, the rejection unit, and the configuration unit are stored in the memory as program units. The processor executes the program units stored in the memory to implement corresponding functions.

The processor includes kernel, and the kernel invokes a corresponding program unit from the memory. There can be one or more kernels to improve security of the server by adjusting a kernel parameter.

The memory can include a non-persistent storage, a random access memory (RAM), and/or a nonvolatile memory in a computer readable medium, for example, a read-only memory (ROM) or a flash memory (flash RAM). The memory includes at least one storage chip.

The present disclosure further provides a computer program product, and when being executed on a data processing apparatus, the product is applicable to initialize the program code that includes the following steps: when receiving a page request sent by a browser, dynamically and randomly allocating a page script corresponding to the page request from a plurality of page scripts corresponding to the page request; sending the dynamically and randomly allocated page script to the browser, so that the browser executes the page script to obtain a script execution parameter; when receiving a page verification request sent by the browser, determining whether the page verification request is expired; and if expired, outputting error prompt information indicating page expiration; or if not expired, verifying whether the script execution parameter included in the page verification request is valid; and if invalid, rejecting the page request.

A person of ordinary skill in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a magnetic disk storage, a CD-ROM, an optical memory, etc.) that include computer-usable program code.

The present disclosure is described with reference to the flowcharts and/or block diagrams of the method and device for preventing a server from being attacked and the computer program product, according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent storage, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. A computer storage medium includes but is not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic disk storage, another magnetic storage device, or any other non-transitory medium. The computer storage medium can be used to store information accessible by the computing device. Based on the definition in the present specification, the computer readable medium does not include transitory computer-readable media (transitory media), for example, a modulated data signal and carrier.

The previous descriptions are only implementations of the present disclosure, and are not intended to limit the present disclosure. A person of ordinary skill in the art can make various modifications and variations to the present disclosure. Any modifications, equivalent substitutions, or improvements made without departing from the spirit and principle of the present disclosure shall fall in the scope of the claims in the present disclosure.

Figure 6:
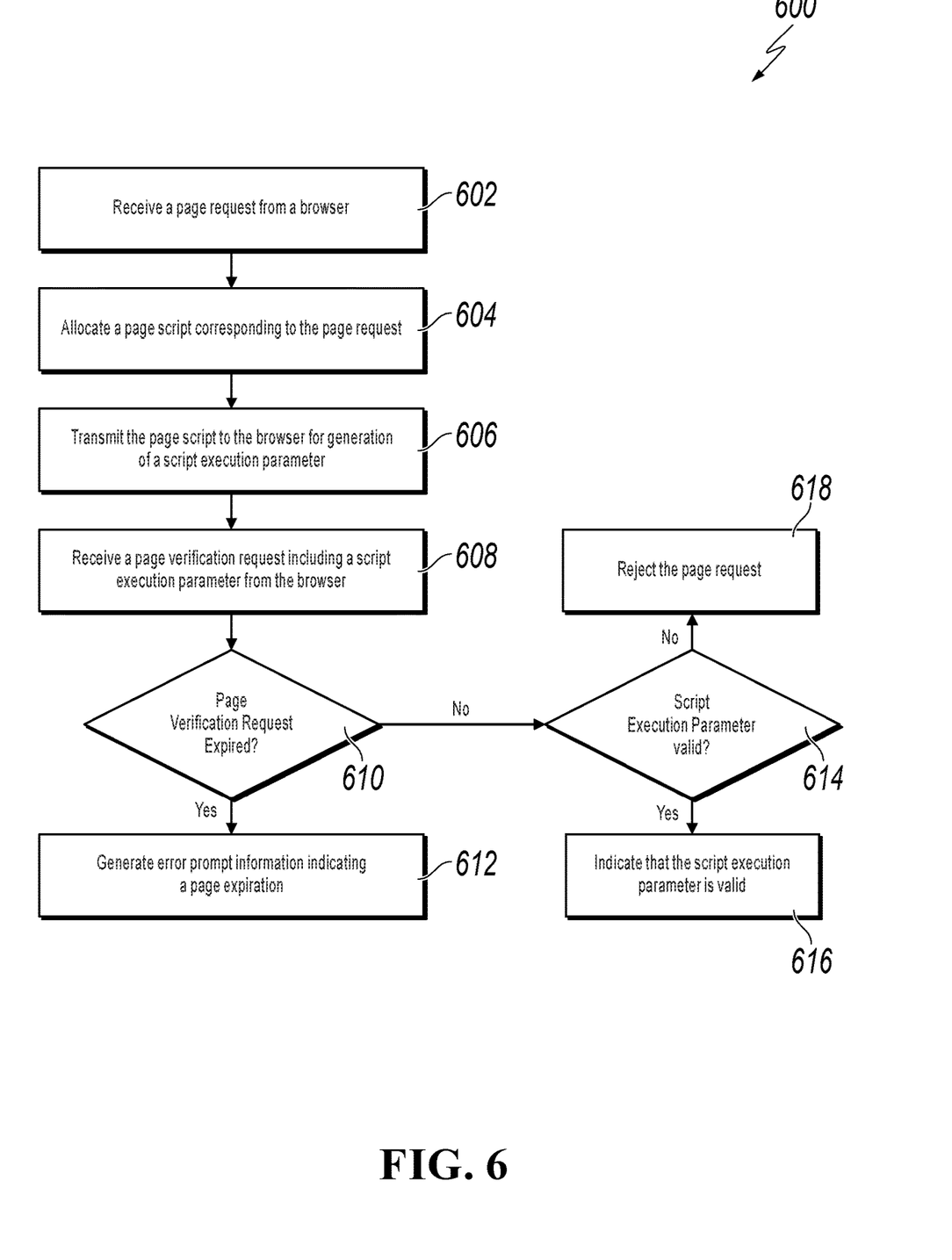
FIG. 6 is a flowchart illustrating an example of a computer-implemented method for preventing a server from being attacked, according to an implementation of the present disclosure.

FIG. 6 is a flowchart illustrating an example of a computer-implemented method 600 for preventing a server from being attacked, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a page request is received from a browser. In some implementations, the page request further includes identifier information of a page script executed by the browser. From 602, method 600 proceeds to 604.

At 604, a page script corresponding to the page request is allocated from a plurality of page scripts corresponding to the page request. In some implementations, the allocation of the page script is dynamic and random, and the allocation of the page script includes: 1) obtaining a page URL from the page request and 2) extracting a random page script from a plurality of page scripts corresponding to the page URL and from a predetermined script library, where different script execution parameter acquisition logic is used in the plurality of page scripts. In some implementations, before extracting the random page script: 1) page scripts corresponding to each page URL in the predetermined script library are configured and 2) identifier information corresponding to the page scripts is configured. From 604, method 600 proceeds to 606.

At 606, the page script is transmitted to the browser for generation of a script execution parameter by execution of the page script by the browser. From 606, method 600 proceeds to 608.

At 608, a page verification request is received from the browser, where the page verification request includes the script execution parameter. From 608, method 600 proceeds to 610.

At 610, a determination is made as to whether a page verification request is expired. If it is determined that the page verification request is expired, method 600 proceeds to 612. Otherwise, if it is determined that the page verification request is not expired, method 600 proceeds to 614. In some implementations, the determination of whether the page verification request is expired includes calculating, as a result, whether a request time of the page verification request is later than the sum of a predetermined time period and a time for the browser to execute the page script. If the result is yes, determining that the page verification request is expired or, if the result is no, determining that the page verification request is not expired.

At 612, error prompt information is generated indicating a page expiration. After 612, method 600 can stop.

At 614, a determination is made as to whether the script execution parameter is valid. If it is determined that the script execution parameter is valid, method 600 proceeds to 616. Otherwise, if it is determined that the script execution parameter is not valid, method 600 proceeds to 618. In some implementations, the verification of whether the script execution parameter is valid includes: 1) searching the predetermined script library for a page script corresponding to the identifier information, where the predetermined script library stores identifier information corresponding to each page script and 2) determining, based on the page script corresponding to the identifier information, whether the script execution parameter is valid. In some implementations, the determination, based on the page script corresponding to the identifier information, of whether the script execution parameter is valid includes: 1) obtaining a local script parameter based on the page script corresponding to the identifier information; 2) calculating, as a result, whether the local script parameter is identical to the script execution parameter included with the page verification request; and 3) if the result is yes, determining that the script execution parameter is valid; or if the result is no, determining that the script execution parameter is not valid.

At 616, the determined validity is indicated. After 616, method 600 can stop.

At 618, the page request is rejected. After 618, method 600 can stop.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
receiving, by a server, a page request from a browser;
obtaining, by the server, a page URL from the page request;
extracting, by the server and from a predetermined script library, a page script randomly from a plurality of page scripts corresponding to the page URL, wherein the page script comprises script execution parameter acquisition logic dynamically generated using a random number;
transmitting, by the server, identifier information corresponding to the page script and the page script to the browser for generation of a script execution parameter by execution of the page script by the browser; and
receiving, by the server, a page verification request from the browser, wherein the page verification request includes the script execution parameter and the identifier information corresponding to the page script transmitted by the server to the browser.

2. The computer-implemented method of claim 1, the further comprising:
determining, by the server, whether the page verification request is expired, comprising:
calculating, by the server and as a result, whether a request time of the page verification request is later than a sum of a predetermined time period and a time for the browser to execute the page script; and
if the result is yes, determining, by the server, that the page verification request is expired; or
if the result is no, determining, by the server, that the page verification request is not expired.

3. The computer-implemented method of claim 2, further comprising:
in response to determining that the page verification request is expired, generating, by the server, error prompt information indicating a page expiration; or
in response to determining that the page verification request is not expired:
determining, by the server, whether the script execution parameter is valid, wherein:
if valid, indicating, by the server, that the script execution parameter is valid: or
if not valid, rejecting, by the server, the page request;
and wherein the determining, by the server, whether the script execution parameter is valid comprises:
searching, by the server, the predetermined script library for a page script corresponding to the identifier information, wherein the predetermined script library stores identifier information corresponding to each page script of the plurality of the page scripts corresponding to the page URL; and
determining, by the server and based on the page script corresponding to the identifier information, whether the script execution parameter is valid.

4. The computer-implemented method of claim 3, wherein the determining, by the server and based on the page script corresponding to the identifier information, whether the script execution parameter is valid comprises:
obtaining, by the server, a local script parameter based on the page script corresponding to the identifier information;
calculating, by the server and as a second result, whether the local script parameter is identical to the script execution parameter included with the page verification request; and
if the second result is yes, determining, by the server, that the script execution parameter is valid; or
if the second result is no, determining, by the server, that the script execution parameter is not valid.

5. The computer-implemented method of claim 1, wherein the random number is generated using a time when the page request is received by the server.

6. The computer-implemented method of claim 1, wherein, before extracting the page script randomly from the plurality of page scripts corresponding to the page URL:
configuring, by the server, page scripts corresponding to each page URL in the predetermined script library; and
configuring, by the server, identifier information corresponding to the page scripts.

7. The computer-implemented method of claim 1, wherein the script execution parameter acquisition logic is dynamically generated using a random number based on a current time or a random number generated based on a time for sending the page request.

8. A non-transitory, computer-readable medium storing one or more instructions executable by a computer system to perform operations comprising:
   receiving, by the computer system, a page request from a browser;
   obtaining, by the computer system, a page URL from the page request;
   extracting, by the computer system and from a predetermined script library, a page script randomly from a plurality of page scripts corresponding to the page URL, wherein the page script comprises script execution parameter acquisition logic dynamically generated using a random number;
   transmitting, by the computer system, identifier information corresponding to the page script and the page script to the browser for generation of a script execution parameter by execution of the page script by the browser; and
   receiving, by the computer system, a page verification request from the browser, wherein the page verification request includes the script execution parameter and the identifier information corresponding to the page script transmitted by the computer system to the browser.

9. The non-transitory, computer-readable medium of claim 8, further comprising:
   determining, by the computer system, whether the page verification request is expired, comprising:
      calculating, by the computer system and as a result, whether a request time of the page verification request is later than a sum of a predetermined time period and a time for the browser to execute the page script; and
      if the result is yes, determining, by the computer system, that the page verification request is expired; or
      if the result is no, determining, by the computer system, that the page verification request is not expired.

10. The non-transitory, computer-readable medium of claim 9, further comprising:
   in response to determining that the page verification request is expired, generating, by the computer system, error prompt information indicating a page expiration; or
   in response to determining that the page verification request is not expired:
      determining, by the computer system, whether the script execution parameter is valid, wherein:
         if valid, indicating, by the computer system, that the script execution parameter is valid; or
         if not valid, rejecting, by the computer system, the page request;
      and wherein the determining, by the computer system, whether the script execution parameter is valid comprises:
         Searching, by the computer system, the predetermined script library for a page script corresponding to the identifier information, wherein the predetermined script library stores identifier information corresponding to each page script of the plurality of the page scripts corresponding to the page URL; and
         determining, by the computer system and based on the page script corresponding to the identifier information, whether the script execution parameter is valid.

11. The non-transitory, computer-readable medium of claim 10, wherein the determining, by the computer system and based on the page script corresponding to the identifier information, whether the script execution parameter is valid comprises:
   obtaining, by the computer system, a local script parameter based on the page script corresponding to the identifier information;
   calculating, by the computer system and as a second result, whether the local script parameter is identical to the script execution parameter included with the page verification request; and
   if the second result is yes, determining, by the computer system, that the script execution parameter is valid; or
   if the second result is no, determining, by the computer system, that the script execution parameter is not valid.

12. The non-transitory, computer-readable medium of claim 8, wherein the random number is generated using a time when the page request is received by the computer system.

13. The non-transitory, computer-readable medium of claim 8, wherein, before extracting the page script randomly from the plurality of page scripts corresponding to the page URL:
   configuring, by the computer system, page scripts corresponding to each page URL in the predetermined script library; and
   configuring, by the computer system, identifier information corresponding to the page scripts.

14. The non-transitory, computer-readable medium of claim 8, wherein the script execution parameter acquisition logic is dynamically generated using a random number based on a current time or a random number generated based on a time for sending the page request.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving, by a server computer, a page request from a browser;
      obtaining, by the server computer, a page URL from the page request;
      extracting, by the server computer and from a predetermined script library, a page script randomly from a plurality of page scripts corresponding to the page URL, wherein the page script comprises script execution parameter acquisition logic dynamically generated using a random number;
      transmitting, by the server computer, identifier information corresponding to the page script and the page script to the browser for generation of a script execution parameter by execution of the page script by the browser; and
      receiving, by the server computer, a page verification request from the browser, wherein the page verification request includes the script execution parameter and the identifier information corresponding to the page script transmitted by the server computer to the browser.

16. The computer-implemented system of claim 15, further comprising:
   determining, by the server computer, whether the page verification request is expired, comprising:
      calculating, by the server computer and as a result, whether a request time of the page verification request is later than a sum of a predetermined time period and a time for the browser to execute the page script; and if the result is yes, determining, by the server computer, that the page verification request is expired; or if the result is no, determining, by the server computer, that the page verification request is not expired.

17. The computer-implemented system of claim 16, further comprising:

in response to determining that the page verification request is expired, generating, by the server computer, error prompt information indicating a page expiration; or in response to determining that the page verification request is not expired:

determining, by the server computer, whether the script execution parameter is valid, wherein:

if valid, indicating, by the server computer, that the script execution parameter is valid; or if not valid, rejecting, by the server computer, the page request;

and wherein the determining, by the server computer, whether the script execution parameter is valid comprises:

Searching, by the server computer, the predetermined script library for a page script corresponding to the identifier information, wherein the predetermined script library stores identifier information corresponding to each page script of the plurality of the page scripts corresponding to the page URL; and determining, by the server computer and based on the page script corresponding to the identifier information, whether the script execution parameter is valid.

18. The computer-implemented system of claim 17, wherein the determining, by the server computer and based on the page script corresponding to the identifier information, whether the script execution parameter is valid comprises:

obtaining, by the server computer, a local script parameter based on the page script corresponding to the identifier information;

calculating, by the server computer and as a second result, whether the local script parameter is identical to the script execution parameter included with the page verification request; and if the second result is yes, determining, by the server computer, that the script execution parameter is valid; or if the second result is no, determining, by the server computer, that the script execution parameter is not valid.

19. The computer-implemented system of claim 15, wherein the random number is generated using a time when the page request is received by the server computer.

20. The computer-implemented system of claim 15, wherein the script execution parameter acquisition logic is dynamically generated using a random number based on a current time or a random number generated based on a time for sending the page request.

* * * * *